(12) United States Patent
Jalla

(10) Patent No.: US 11,282,151 B2
(45) Date of Patent: Mar. 22, 2022

(54) METHOD AND SYSTEM FOR IDENTIFYING FAILED MEMBERS POST STRESS ANALYSIS TEST

(71) Applicant: Consulting Engineers, Corp., Reston, VA (US)

(72) Inventor: Maharaj Jalla, Great Falls, VA (US)

(73) Assignee: Consulting Engineers, Corp., Reston, VA (US)

( * ) Notice: Subject to any disclaimer, the term of this patent is extended or adjusted under 35 U.S.C. 154(b) by 0 days.

(21) Appl. No.: 16/697,280

(22) Filed: Nov. 27, 2019

(65) Prior Publication Data
US 2021/0110079 A1    Apr. 15, 2021

Related U.S. Application Data

(60) Provisional application No. 62/912,692, filed on Oct. 9, 2019.

(51) Int. Cl.
| | | |
|---|---|---|
| *G06Q 50/08* | (2012.01) | |
| *G05B 19/418* | (2006.01) | |
| *G06F 30/13* | (2020.01) | |
| *G06T 19/20* | (2011.01) | |
| *G01B 21/28* | (2006.01) | |
| *G01B 21/30* | (2006.01) | |
| *G06T 17/10* | (2006.01) | |
| *G01B 21/08* | (2006.01) | |
| *G06T 15/10* | (2011.01) | |
| *G06F 111/02* | (2020.01) | |

(Continued)

(52) U.S. Cl.
CPC ............ *G06Q 50/08* (2013.01); *G01B 21/08* (2013.01); *G01B 21/28* (2013.01); *G01B 21/30* (2013.01); *G05B 19/41805* (2013.01); *G06F 30/13* (2020.01); *G06T 15/10* (2013.01); *G06T 17/10* (2013.01); *G06T 19/20* (2013.01); *G06F 2111/02* (2020.01); *G06F 2111/20* (2020.01); *G06F 2113/24* (2020.01); *G06T 2210/04* (2013.01)

(58) Field of Classification Search
CPC ......... G06F 30/13; G01B 21/28; G01B 21/30; G06T 17/10; G06T 19/20
USPC ............................................................ 703/1
See application file for complete search history.

(56) References Cited

U.S. PATENT DOCUMENTS

2007/0174026 A1* 7/2007 Mangon ................ G06F 30/13
703/1

OTHER PUBLICATIONS

Bridge_Design_Project_2013 (Bridge Design Project Engineering Design and Technology Series, 2013) (Year: 2013).*

(Continued)

*Primary Examiner* — Brian S Cook
(74) *Attorney, Agent, or Firm* — Andrew Morabito

(57) ABSTRACT

The present invention is a computer method of identifying failed members in a structure, comprising: extracting, a frame of a building, wherein the frame is comprised of a plurality of members; applying, at least one load on at least one of the plurality of members; analyzing, each of the plurality of members related to the stresses which are applied to each of the members by the at least one applied load; identifying, any members where the stresses exceed a predetermined maximum stress value; marking, each member within the building which was identified; generating, a report of the identified members and the calculations related to each of the identified members.

6 Claims, 6 Drawing Sheets

(51) Int. Cl.
*G06F 113/24* (2020.01)
*G06F 111/20* (2020.01)

(56) References Cited

OTHER PUBLICATIONS

Araque_2019 (Computational Modeling of Fatique Crack Propagation in Butt Welded Joints Subjected to Axial Load, Jun. 27, 2019). (Year: 2019).*
Technical_Manual_1996 (TM 1-1520-238-BD 1996). (Year: 1996).*
Accuracy_2015 (The Essentials of Accuracy in 2D and 3D Conversion downloaded from https://www.cadcam.org/blog/essentials-accuracy-2d-3d-conversion/indexed on Jan. 30, 2015). (Year: 2015).*
AUTODESK_2016 (Exclude components and features from analysis, Autodesk help Feb. 9, 2016). (Year: 2016).*

\* cited by examiner

US 11,282,151 B2

METHOD AND SYSTEM FOR IDENTIFYING FAILED MEMBERS POST STRESS ANALYSIS TEST

CROSS-REFERENCE TO RELATED APPLICATIONS

This application is a continuation-in-part (and claims the benefit of priority under 35 USC 120) of U.S. provisional application No. 62/2912688 filed Oct. 9, 2019, U.S. provisional application No. 62/912692 filed Oct. 9, 2019. The disclosure of the prior applications is considered part of (and is incorporated by reference in) the disclosure of this application.

BACKGROUND

This disclosure relates generally to the analysis of individual members of a building, and more specifically to a method, computer program and computer system for generating a list of members which failed the analysis.

Computer Aided Design software is well-known, and used by architects, engineers, designers, planners, construction firms, and owner operators and the like to create and use precision models and technical illustrations. The software is used to create design simulations that are two-dimensional (2-D) drawings, and three-dimensional (3-D) models and related tabular and business property data.

Three-dimensional (3D) assets are commonly designed, analyzed, and built, using a process in which design teams invest large amounts of time, money, and effort, creating insightful 3D digital models of those assets using design software. Design teams gain a tremendous amount of insight into projects while constructing and editing these 3D models. These 3D models are used commonly for analytical and visualization purposes, and increasingly, models are used to automate the production of conventional construction drawings.

These 3D models are typically analyzed and run through tests to determine if the model can withstand the various loads or forces applied to the model or the individual members of the model. This assists the designer construct a model that is able to withstand the various forces or loads the parts will experience in the real world. This is an incredible cost and time saving process. However, there is little advancements in providing to the user the list of the parts which failed the test, how they failed, and why they failed.

Therefore, a piece of software that is able to identify the failed members, the conditions under which the members failed, and provide them in a report would provide the benefits of allowing the tester to see exactly what members failed and allow them to focus their attention to these areas to modify the building to correct these issues directly.

SUMMARY

In a first embodiment, the present invention is a computer method of identifying failed members in a structure, comprising: extracting, by one or more processors, a frame of a building, wherein the frame is comprised of a plurality of members; applying, by one or more processors, at least one load on at least one of the plurality of members; analyzing, by one or more processors, each of the plurality of members related to the stresses which are applied to each of the members by the at least one applied load; identifying, by one or more processors, any members where the stresses exceed a predetermined maximum stress value; marking, by one or more processors, each member within the building which was identified; generating, by one or more processors, a report of the identified members and the calculations related to each of the identified members.

In a second embodiment, the present invention is a computer program product for identifying failed members in a structure, the computer program product comprising a computer readable storage medium having program instructions embodied therewith, the program instructions executable by a computing device to cause the computing device to: program instructions to extract a frame of a building, wherein the frame is comprised of a plurality of members; program instructions to apply at least one load on at least one of the plurality of members; program instructions to analyze each of the plurality of members related to the stresses which are applied to each of the members by the at least one applied load; program instructions to identify any members where the stresses exceed a predetermined maximum stress value; program instructions to mark each member within the building which was identified; program instructions to generate a report of the identified members and the calculations related to each of the identified members.

In a third embodiment, the present invention is a system comprising: a CPU, a computer readable memory and a computer readable storage medium associated with a computing device; program instructions to extract a frame of a building, wherein the frame is comprised of a plurality of members; program instructions to apply at least one load on at least one of the plurality of members; program instructions to analyze each of the plurality of members related to the stresses which are applied to each of the members by the at least one applied load; program instructions to identify any members where the stresses exceed a predetermined maximum stress value; program instructions to mark each member within the building which was identified; program instructions to generate a report of the identified members and the calculations related to each of the identified members.

BRIEF DESCRIPTION OF THE DRAWINGS

Referring now to the drawings in which like reference numbers represent corresponding parts throughout.

DETAILED DESCRIPTION

Figure 1:
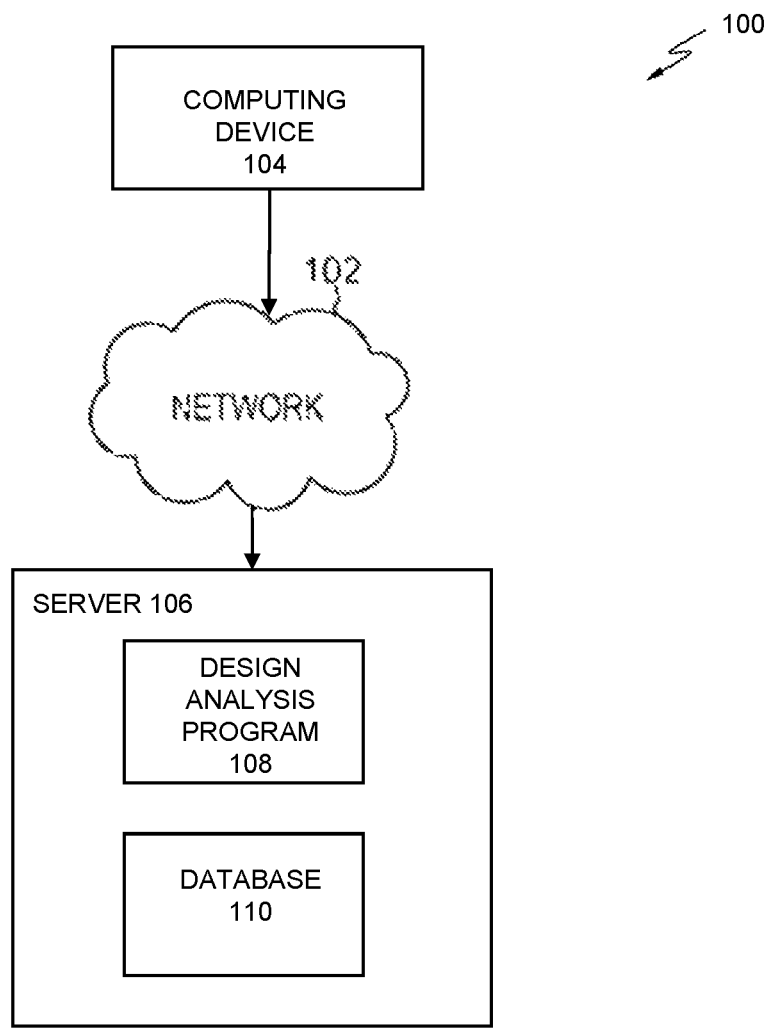
FIG. 1 depicts a block diagram depicting a computing environment, in accordance with one embodiment of the present invention.

The present invention generally related to the process of engineering related to cold formed steel buildings, performing an analysis on a 3D generated model, reviewing the results, and identifying specifically which members of the structure failed, and the values associated with the failed results. This provides an advantage because the process of manually reviewing the results and identify the failed members is time consuming task. The present invention provides a simplified result with all the desired information in the form of a sick list with numerous calculated values to clearly identify how and where the member failed. This provides a clear an conscious report for all the members of the structure.

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, netbook computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment the Design Analysis Program 108 and database 110 are located on server 106. Server 106 may include components, as depicted and described in further detail with respect to FIG. 1.

Design Analysis Program 108 provides for the ability to analyze a model and receive data related to the individual members of the structure, how they failed, the calculated values of their failure, and other information related to the members which can assist the user with modifying the individual members or assemblies to re-run the test and produce passing results for all the members. With the generation of the sick list, the program 108 provides a detailed and direct report as to the specific members. In some structures there may be hundreds or thousands of members and to pin point the exact member that failed, under what load, and the rate at which it failed is vital to correcting the model quickly and efficiently. In the depicted embodiment, the Design Analysis Program 108 utilizes network 102 to access the computing device 104 and to communicate with database 110. In one embodiment, the Design Analysis Program 108 resides on computing device 104. In other embodiments, the Design Analysis Program 108 may be located on another server or computing device, provided the Design Analysis Program 108 has access to database 110. In some embodiments, the Design Analysis Program 108 is a separate program or an Add-In to other preexisting technology. The Design Analysis Program 108 works with a single interface for building modeling, design, construction, and machine generation files. The Design Analysis Program 108 allows for the editing of the building materials to adjust the building design and construction.

Database 110 may be a repository that may be written to and/or read by Design Analysis Program 108. Information gathered from computing device 104 and the 1-dimensional, 2-dimensional, and 3-dimensional drawings and models, the laws and regulations, and the reports. In one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to Design Analysis Program 108.

Figure 2:
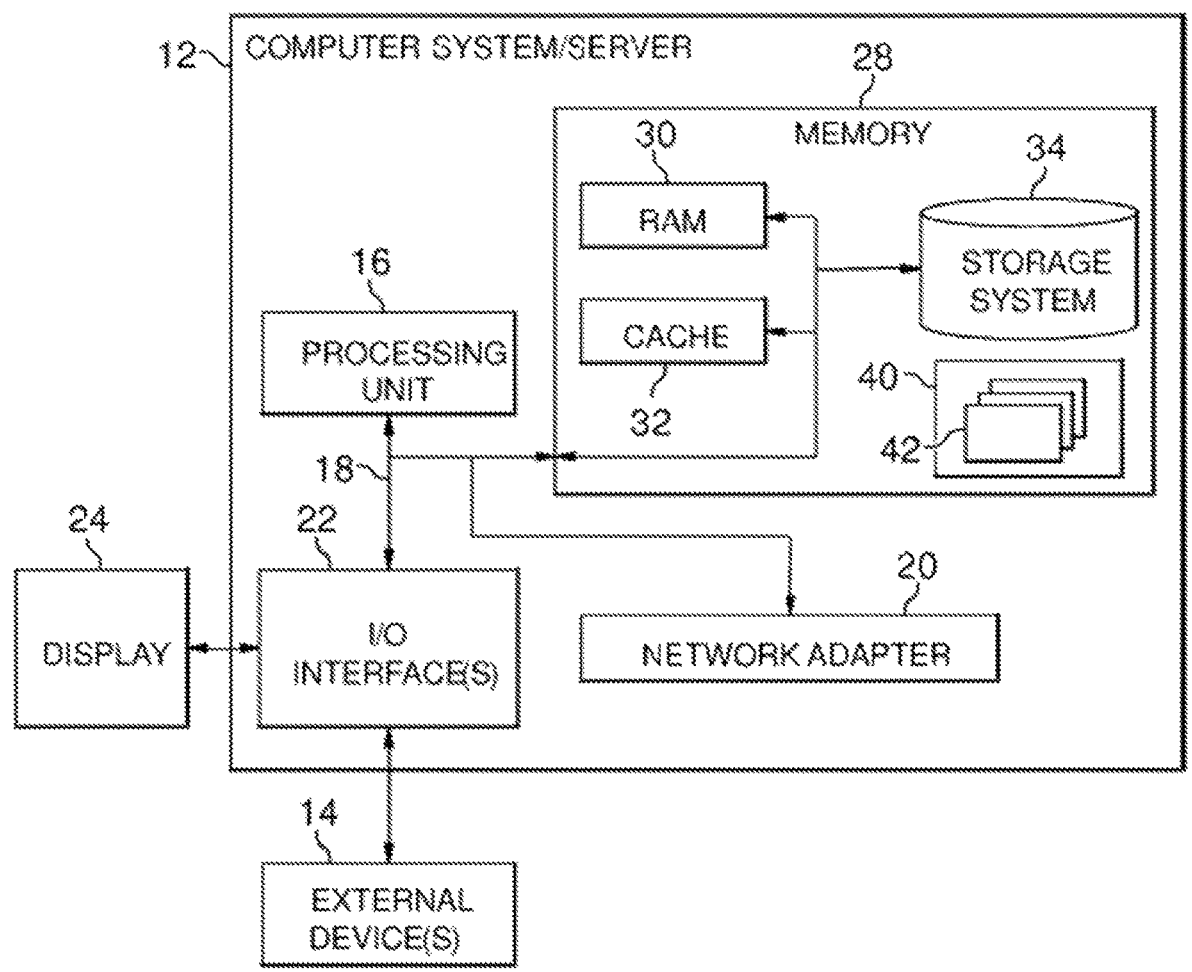
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
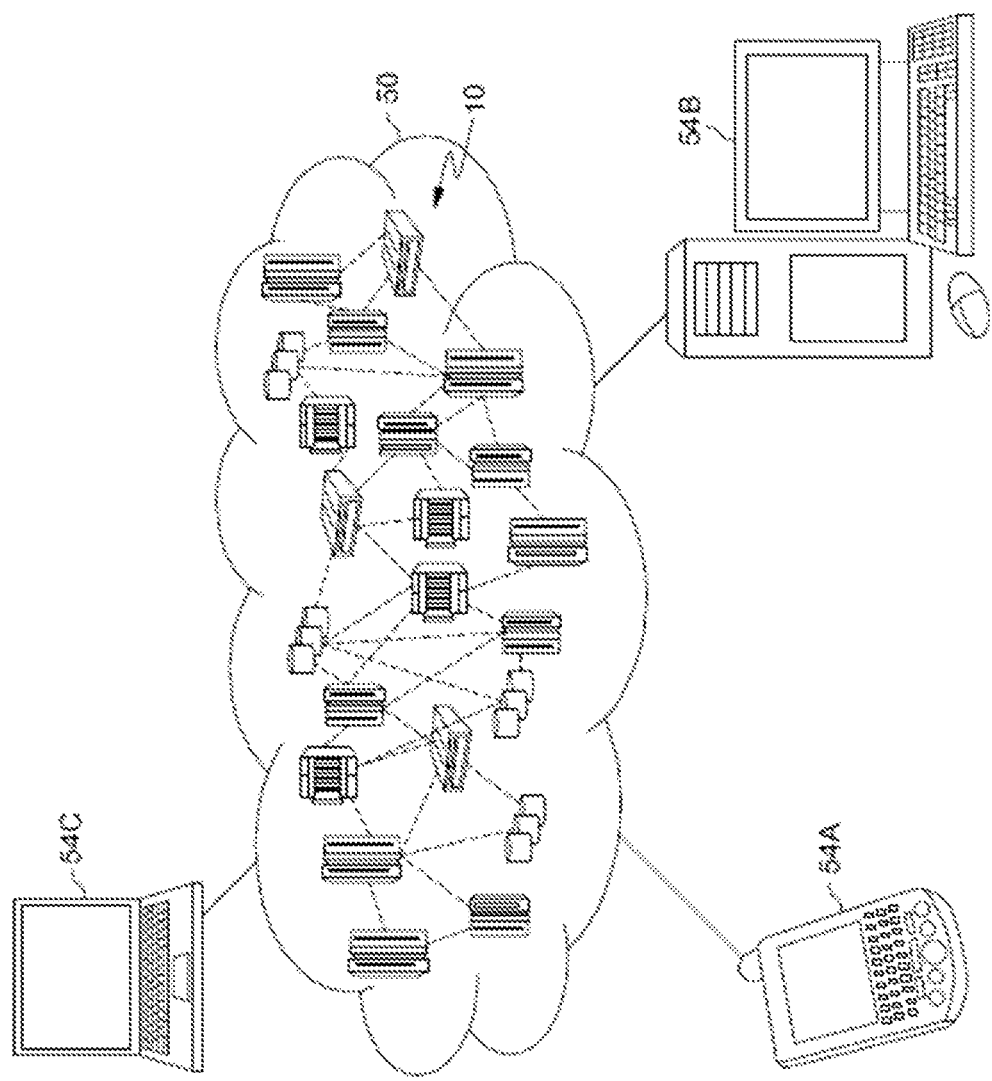
FIG. 3 depicts a cloud computing environment, in accordance with one embodiment of the present invention.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or additional computer systems may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein.

Figure 4:
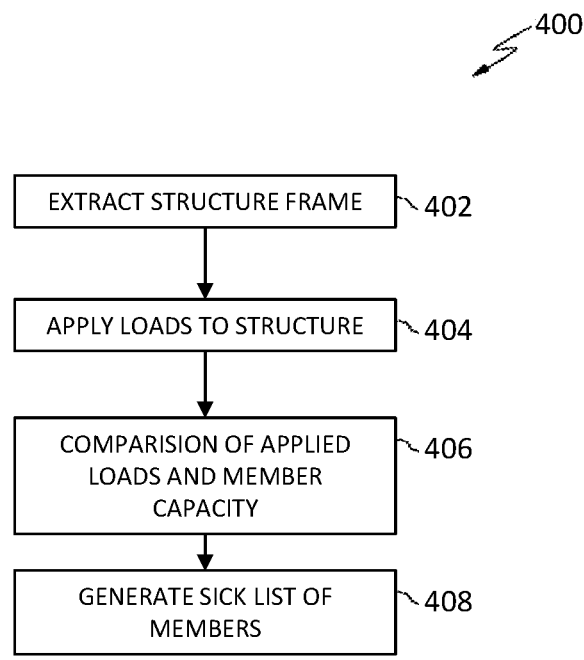
FIG. 4 depicts a flowchart of the operational steps of a method for processing and analyzing a 3-Dimensional model within the computing environment of FIG. 1, in accordance with another embodiment of the present invention.

FIG. 4 depicts flowchart 400 depicting a method according to the present invention. The method(s) and associated process(es) are now discussed, over the course of the following paragraphs, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The Design Analysis Program 108 is able to generate a model of the building from the generated drawings, analyze the model, and either determine conflicts or issues with the model or generate a variety of reports based related to the model.

In step 402, the Design Analysis Program 108 processes the architectural drawings to generate a set of design drawings. Wherein the design drawings have removed all unnecessary elements of the architectural drawings and what remains in the structural frame members.

Architectural drawings typically show all the building related information which is required for the construction of the building. It shows the different room locations, sizes of the room, arrangements of different rooms. It also shows the wall sheathing or finishing material used for the exterior of the building and the interior of the rooms. Through the process of extracting the centerline of the structure members, redacting the non-essential elements of the architecture drawings, and generating a design drawing of the frame of the structure. This design drawing may include the apertures (e.g. windows and doors) if they are present in the architecture drawings. These design drawings are used for the analysis of the structure. In some embodiments, the frame is a single element. In other embodiments, the Design Analysis Program 108 is able to populate individual members in place of the solid model frame in the design drawing. Based on specific data related to the cross section of the members, the material of the member, the spacing of the member, or the like. The drawing can contain the individual members to provide an even more accurate analysis. This step is not a requirement is a drawing or model is already created containing the frame or frame members.

The process, in one embodiment, reviews the drawings, the user inputs the default properties for each element type, the trusses are identified based on the type of truss (e.g. scissors, pitched, sawtooth, flat, or other), the option of single or multiple truss classes is identified, the trusses are marked. Then the wall attributes are selected. The window attributes are selected, the door attributes are selected. The joists are marked and the program identifies this in the main file. With the design outputs, the various elements can have their properties adjusted such as depth, material thickness and strength, spacing, span, and the like.

In step 404, the Design Analysis Program 108 applies various load to the structure and or the members of the structure. The loads applied are based on user selected options to simulate the forces and stresses which are applied to each member or the frame to determine if the building is built within the desired safety factor or tolerance related to local laws or regulations. These loads are adjustable and modifiable based on the users desires. In some embodiments, the Design Analysis Program 108, through various machine learning or computer learning technologies know in the art. The program 108 is able to automatically generate the stresses and loads.

Building design is checked to safely resist the live load which is the load produced by the use and occupancy of the building or other structure that does not include construction of environmental loads such as rain, snow, earthquake, wind, dead load.

Building design is checked to safely resist the Dead load which is the weight of all materials of construction incorporated into the building including, but not limited to, walls, floors, roofs, ceilings, stairways, built-in partitions, finishes, cladding, and other similarly incorporated architectural and structural items, and fixed service equipment including the weight of cranes.

Building design is checked to safely resist the Snow load which is the load induced due to accumulation of the snow over the surface of the building.

Building design is checked to safely resist the Wind load and earthquake load also. Wind load and earthquake load are applied in horizontal direction.

Further the load combinations are applied to all the loads mentioned above which are prescribed by the building code in project jurisdiction and local amendments in the building code as per local conditions.

In step 406, the Design Analysis Program 108 compares the applied loads and forces with the member capacity. Through the comparison of the member properties and the result of the applied loads and forces. The Design Analysis program 108 is able to determine if the member failed under the load or force, under what condition the member failed. In some embodiments, failure of a member may be based on a predetermined value and may be above the capacity of the member. This may come into play with design codes or safety factors.

Figure 5:
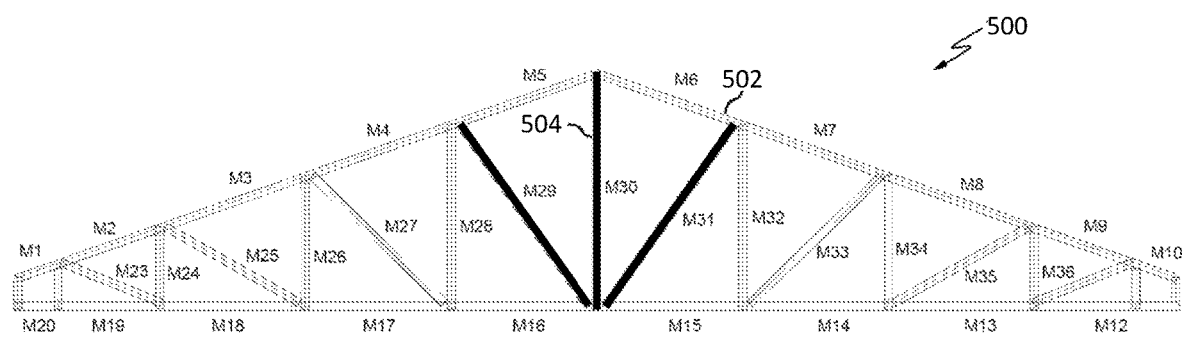
FIG. 5 depicts exemplary images of a building floor where specific members are identified, in accordance with one embodiment of the present invention.
Figure 6:
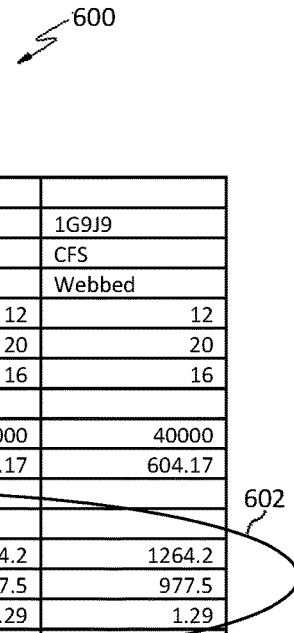
FIG. 6 depicts a report of the analysis of the 3-Dimensional model, in accordance with one embodiment of the present invention.

In step 408, the Design Analysis Program 108 generates the sick list. The sick list is the report identifying all the members which failed under the present loads and/or forces. The report generally includes a list of the members, the forces applied, a comparison of actual to allowable stress on the member based on the force. An example of this is shown in FIG. 6 where a report is shown identifying specific members which had failures, the comparison of the actual to allowed stressed and highlighting the members which failed and what forces they failed under. In some embodiments, this report may be linked to a model or drawing so that a user is able to quickly see where in the structure this member is located and determine the necessary changes which need to be made. Optimization of the design may be included in the report to provide possible solutions to the failed member(s). Through computer learning and artificial intelligence, the Design Analysis Program 108 may provide modifications to the member, replacement of the member, the additional of other members, adjusting the connection or fastening locations of the member or the like to correct the failure. Shown in FIG. 5 is an illustration of a portion of a building 500 where each member is identified by and members 504 which failed the analysis are depicted visually in a different manner than those members 502 which did not fail. FIG. 6 shows an example of the sick list 600 where a set of members are identified. This list shows the various forces and stresses on the members as well as the limitations of the members based on their properties. In the depicted illustration the circled set of results identifies that these members failed the bending stress, the ratio of the failure, and a comparison of the actual and allowable stresses of these members.

In some embodiments, the sick list is prepared for the all the members in the structure and the sick list is grouped as per the assembly, e.g. walls, roof trusses, floor trusses are grouped in different groups. In some embodiments, the sick list is grouped by different floor levels in a multi floor building.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer method of identifying failed members in a structure, comprising:

processing, by one or more processors, a set of architectural drawings to identify structural members and structural assemblies, wherein non-structural members are removed based on a centerline of the structural members;

extracting, by one or more processors, the structural members and forming a 3D model of the structural members, and a set of properties are applied to each of the structural members;

connecting, by one or more processors, the structural members based on the architectural drawings to form the structural assemblies and the structure;

identifying, by one or more processors, apertures which are associated with a failed member;

applying, by one or more processors a set of attributes to each structural element, each structural assembly, and each aperture;

applying, by one or more processors, at least one live load, at least one dead load, and at least one force on at least one of the structural members, wherein the live load and the dead load are based on a final structure design and build;

analyzing, by one or more processors, each of the structural members related to the applied loads and forces;

identifying, by one or more processors, the structural members which failed the applied loads and forces, and indicating which load or force caused the structural member to fail;

marking, by one or more processors, each of the structural members which were identified;

generating, by one or more processors, a report of the identified members and the calculations related to each of the identified members, wherein the report is identified based on the type of the structural member and the report includes a comparison of each of the structural members based on the applied loads and forces;

connecting, by one or more processors, the structural member entries in the report to the model, wherein if a structural member is selected in the report the structural member in the model is identified; and identifying, by one or more processors, modifications to at least one of the structural members to overcome the failed members.

2. The computer method of claim 1, wherein the marking of the identified members includes highlighting the identified members in a model or drawing.

3. The computer method of claim 1, further comprising, providing, by one or more processors, a modification to the identified member based on the stress which exceeded the predetermined maximum stress value.

4. The computer method of claim 1 further comprising, analyzing, by one or more processors, causes for the exceeding of the predetermined maximum stress value.

5. A computer program product for identifying failed members in a structure, the computer program product comprising a computer readable storage medium having program instructions embodied therewith, the program instructions executable by a computing device to cause the computing device to:

program instructions to process a set of architectural drawings to identify structural members and structural assemblies, wherein non-structural members are removed based on a centerline of the structural members;

program instructions to extract the structural members and forming a 3D model of the structural members, and a set of properties are applied to each of the structural members;

program instructions to connect the structural members based on the architectural drawings to form the structural assemblies and the structure;

program instructions to identify apertures which are associated with a failed member;

program instructions to apply a set of attributes to each structural element, each structural assembly, and each aperture;

program instructions to apply at least one live load, at least one dead load, and at least one force on at least one of the structural members, wherein the live load and the dead load are based on a final structure design and build;

program instructions to analyze each of the structural members related to the applied loads and forces;

program instructions to identify the structural members which failed the applied loads and forces, and indicating which load or force caused the structural member to fail;

program instructions to mark each of the structural members which were identified;

program instructions to generate a report of the identified members and the calculations related to each of the identified members, wherein the report is identified based on the type of the structural member and the report includes a comparison of each of the structural members based on the applied loads and forces;

program instructions to connect the structural member entries in the report to the model, wherein if a structural member is selected in the report the structural member in the model is identified; and program instructions to identify modifications to at least one of the structural members to overcome the failed members.

6. A system comprising:

a CPU, a computer readable memory and a computer readable storage medium associated with a computing device;

program instructions to process a set of architectural drawings to identify structural members and structural assemblies, wherein non-structural members are removed based on a centerline of the structural members;

program instructions to extract the structural members and forming a 3D model of the structural members, and a set of properties are applied to each of the structural members;

program instructions to connect the structural members based on the architectural drawings to form the structural assemblies and the structure;

program instructions to identify apertures which are associated with a failed member;

program instructions to apply a set of attributes to each structural element, each structural assembly, and each aperture;

program instructions to apply at least one live load, at least one dead load, and at least one force on at least one of the structural members, wherein the live load and the dead load are based on a final structure design and build;

program instructions to analyze each of the structural members related to the applied loads and forces;

program instructions to identify the structural members which failed the applied loads and forces, and indicating which load or force caused the structural member to fail;

program instructions to mark each of the structural members which were identified, wherein the marked structural members are highlighted in the model;

program instructions to generate a report of the identified members and the calculations related to each of the identified members, wherein the report is identified based on the type of the structural member and the report includes a comparison of each of the structural members based on the applied loads and forces;

program instructions to connect the structural member entries in the report to the model, wherein if a structural member is selected in the report the structural member in the model is identified; and program instructions to identify modifications to at least one of the structural members to overcome the failed members.

\* \* \* \* \*